United States Patent
Breslin et al.

(10) Patent No.: US 9,729,408 B2
(45) Date of Patent: Aug. 8, 2017

(54) ENCAPSULATING DATA PACKETS

(71) Applicant: VSS Monitoring

(72) Inventors: Terence M. Breslin, San Francisco, CA (US); David Kucharczyk, Santa Fe, NM (US)

(73) Assignee: VSS Monitoring, Inc., Sunnyvale, CA (US)

(*) Notice: Subject to any disclaimer, the term of this patent is extended or adjusted under 35 U.S.C. 154(b) by 233 days.

(21) Appl. No.: 13/766,436

(22) Filed: Feb. 13, 2013

(65) Prior Publication Data

US 2013/0212263 A1 Aug. 15, 2013

Related U.S. Application Data

(60) Provisional application No. 61/599,349, filed on Feb. 15, 2012.

(51) Int. Cl.
G06F 15/173 (2006.01)
H04L 12/26 (2006.01)

(52) U.S. Cl.
CPC .................... *H04L 43/04* (2013.01)

(58) Field of Classification Search
CPC ........................ H04L 69/22; H04L 12/2874
USPC ......................................... 709/224, 230, 227
See application file for complete search history.

(56) References Cited

U.S. PATENT DOCUMENTS

| | | | | |
|---|---|---|---|---|
| 7,558,264 B1* | 7/2009 | Lolayekar et al. | | 370/392 |
| 7,599,360 B2* | 10/2009 | Edsall et al. | | 370/389 |
| 7,899,048 B1* | 3/2011 | Walker et al. | | 370/390 |
| 7,940,658 B2* | 5/2011 | Foschiano et al. | | 370/230 |
| 8,090,869 B2* | 1/2012 | Mathews | | 709/238 |
| 8,223,801 B2* | 7/2012 | Miller et al. | | 370/493 |
| 8,635,448 B2* | 1/2014 | Maino et al. | | 713/156 |
| 8,654,790 B2* | 2/2014 | Haver et al. | | 370/474 |
| 8,832,222 B2* | 9/2014 | Breslin et al. | | 709/217 |
| 8,868,775 B2* | 10/2014 | Filsfils et al. | | 709/232 |
| 2004/0003094 A1* | 1/2004 | See | | 709/227 |
| 2004/0100954 A1* | 5/2004 | Dai et al. | | 370/389 |
| 2005/0021593 A1* | 1/2005 | Fitzgerald et al. | | 709/200 |
| 2005/0097219 A1* | 5/2005 | Goguen et al. | | 709/238 |
| 2011/0087979 A1* | 4/2011 | Breslin et al. | | 715/764 |
| 2012/0008505 A1* | 1/2012 | LaVigne et al. | | 370/241 |

* cited by examiner

*Primary Examiner* — Umar Cheema
*Assistant Examiner* — Tesfu Mekonen
(74) *Attorney, Agent, or Firm* — Locke Lord LLP; Christopher J. Capelli; Scott D. Wofsy

(57) ABSTRACT

A network captured traffic distribution device may receive captured data packets including original destination information. The captured data packets may then be encapsulated with, for example, new address information so that they may be transmitted toward a destination intended by the network capture traffic distribution device and not the original destination. Captured data packets may also be reformatted by the network capture traffic distribution device in order to, for example, be compatible with one or more devices communicatively coupled to the network capture traffic distribution device. Optionally, the encapsulated and/or reformatted captured data packets may further be encrypted prior to transmission toward their intended destination.

29 Claims, 9 Drawing Sheets

600

700

ENCAPSULATING DATA PACKETS

CROSS REFERENCE TO RELATED APPLICATIONS

This application claims priority to U.S. Patent Application Ser. No. 61/599,349 filed Feb. 15, 2012 which is incorporated herein by reference in its entirety.

FIELD OF INVENTION

The present invention relates to communication systems, and more particularly to methods, devices, and systems for encapsulating, reformatting, and/or encrypting captured data packets in communication systems.

BACKGROUND

When captured, data packets include original address information that indicates an originally intended destination for the captured data packets, other than the capturing device. If these captured data packets are then transmitted by the capturing device via a conventional communication network, such as the Internet, they will be directed toward their original destination instead of a destination intended by the capturing device. Thus, in order for the capturing device to transmit the captured data packets to a destination it intends (rather than the original destination of the captured data packet), it must be transmitted via a direct connection between the capturing device and the intended destination. This greatly reduces the capability of capturing device to transmit captured data packets to other, external devices via conventional communication networks.

Also, captured data packets are typically transmitted to data storage devices in their original formats. Typically, these original formats are not compatible with the data storage devices and must therefore be translated, upon receipt, by the data storage devices, thereby increasing the operational costs of the data storage device.

SUMMARY

Methods, devices, and systems for encapsulating, reformatting, and/or encrypting captured data packets are herein provided. Exemplary devices include a network captured traffic distribution device. The network captured traffic distribution device may include a plurality of ingress ports configured to, for example, receive a traffic flow of captured data packets from a source of captured data packets and transmit the traffic flow of captured data packets to a switch.

The switch may be communicatively coupled to the plurality of ingress ports, a plurality of egress ports, a logic component, and/or a processor. The switch may be configured to, for example, transfer captured data packets received from the ingress ports to the logic component and/or processor and transfer data and modified captured data packets from the logic component and/or processor to the plurality of egress ports.

The logic component and/or processor may be communicatively coupled to the switch and configured to receive captured data packets from the switch. The logic component and/or processor may, for example, execute instructions stored in a memory. Execution of the instructions may include, for example, reformatting, encapsulating, and/or encrypting received captured data packets and transmitting encapsulated, reformatted, and/or encrypted data packets to the switch. Captured data packets may be encapsulated for transmission to an external device via a communication network. Exemplary external devices include a data storage device, an external data storage device, a database, a network attached storage (NAS) device, and a storage area network (SAN) device. In some embodiments, the processor and/or logic component may be user configurable.

The network captured traffic distribution device may also include a memory, communicatively coupled to the logic component and/or processor. The memory may, for example, store instructions executable by the logic component and/or processor. In some embodiments, the memory may be user configurable. In some cases, the set of instructions may further include instructions for analyzing received captured data packets according to a criterion and the memory is further configured to store results of the analysis. The set of instructions may also include instructions for translating information associated with a captured data packet from its original format into a format compatible with a data storage device, analyzing received captured data packets according to a criterion and compiling counting and statistical information based on the analysis, and/or monitoring one or more characteristics of a captured data packet included in the traffic flow of captured data packets and/or the traffic flow of captured data packets itself.

In some embodiments, the switch may be further configured to transfer encapsulated captured data packets and/or information regarding encapsulated captured data packets to the memory and the memory may be further configured to store the encapsulated captured data packets and/or information regarding encapsulated captured data packets.

The network captured traffic distribution device may further include a plurality of egress ports configured to receive modified (e.g., encapsulated, reformatted, and/or encrypted) captured data packets from the switch and transmit the modified captured data packets from the network captured traffic distribution device toward the external device via the communication network. One or more of the egress ports may be enabled to transmit data from the network captured traffic distribution device via, for example, a network file transfer protocol, a transmission control protocol (TCP), a file transfer protocol (FTP), a network file system (NFS) protocol, and/or a Internet small computer system interface (iSCSI). In one embodiment, one of the egress ports may be a stacking port that enables the network captured traffic distribution device to be communicatively coupled to another network captured traffic distribution device in a staked topology. Execution of the instructions may then be distributed between the network captured traffic distribution devices included in the stacked topology.

In one embodiment, the network captured traffic distribution device may further include a buffer communicatively coupled to, for example, the switch and/or an egress port. The buffer may be configured to buffer analysis information and/or encapsulated, reformatted, and/or encrypted captured data packets transmitted from the egress port.

In another embodiment, the network captured traffic distribution device may also include a data storage device communicatively coupled to the switch, the logic component, and/or the processor, wherein the data storage device is configured to store the encapsulated, reformatted, and/or encrypted captured data packet. Exemplary methods disclosed herein include receiving a traffic flow of captured data packets at a network captured traffic distribution device. The captured data packets may be received via, for example, a mirror port resident on a source of the captured data packets and/or a traffic capture point located along a communication link between two communicating devices.

The received captured data packets may then be encapsulated for transmission to an external device via a communication network, such as, the Internet, a wide area network (WAN), and a local area network (LAN). The captured data packet may be encapsulated by using, for example, one or more of a data storage, packet capture (PCAP), libPcap, and/or WinPcap protocol. Exemplary external devices include a data storage device included in the network captured traffic distribution device, a database external to the network captured traffic distribution device, a server, a NAS device, a SAN device, a network monitoring device, and a network analysis device The encapsulated captured data packet may be transmitted to toward the external device via the communication network. On some occasions, the encapsulated captured data packet may be transmitted to toward the data storage device via an optical fiber communication link, an Ethernet communication link, a TCP communication link, a network communication link, a packet-switched network communication link, and a wireless communication link. In some embodiments, encapsulation of the captured data packet may include determining a source of the captured data packet and associating a port stamp with the captured data packet indicating the determined source. In other embodiments, encapsulation of the captured data packet may include determining a time when the capture in the data packet is received by the network captured traffic distribution device and associating a time stamp with the captured data packet indicating the determined time.

In one embodiment, the received captured data packet may be analyzed according to, for example, one or more criterion in order to determine a characteristic of the received captured data packet. The determined characteristic may then be incorporated into the encapsulated captured data packet. In another embodiment, the captured data packet and/or the traffic flow of captured data packets may be analyzed in order to determine a characteristic thereof. A result of the analysis may then be encapsulated and transmitted toward the external device.

In another embodiment, the encapsulated captured data packet may be encrypted using any conventionally available encryption protocol or method prior to its transmission toward the external device.

In a further embodiment, a domain name system (DNS) name associated with the encapsulated captured data packet may be determined and resolved into an Internet protocol (IP) address. The IP address may then be resolved into a media access control (MAC) address and the encapsulated captured data packet may be transmitted to an external device associated with the IP address and/or the MAC address via, for example, a TCP communication link.

Another exemplary method disclosed herein includes receiving a traffic flow of captured data packets at a network captured traffic distribution device. The captured data packets may be received via, for example, a mirror port resident on a source of the captured data packets and/or a traffic capture point located along a communication link between two communicating devices.

A received captured data packet may be reformatted into a format compatible with, for example, a data storage device communicatively coupled to the network captured traffic distribution device. The reformatted captured data packet may then be transmitted toward the data storage device.

In one embodiment, the received captured data packet may be analyzed according to, for example, one or more criterion in order to determine a characteristic of the received captured data packet. The determined characteristic may then be used for reformatting the captured data packet and/or incorporated into the reformatted captured data packet. In another embodiment, the captured data packet and/or the traffic flow of captured data packets may be analyzed in order to determine a characteristic thereof. A result of the analysis may then be formatted, or reformatted, into a format compatible with the data storage device and transmitted toward the data storage device.

On some occasions, the data storage device may be internal to the network captured traffic distribution device and the results of the analysis may be stored on the data storage device. The network captured traffic distribution device may then enable the external device to access to the stored analysis results.

In one embodiment, the reformatted captured data packets may be encapsulated for transmission to the data storage device via a communication network and transmitted toward the data storage device via the communication network.

Exemplary systems provided herein include a source of a traffic flow of captured data packets, a network captured traffic distribution device, and an external device communicatively coupled to one another. The source may capture data packets transmitted between two nodes and/or receive captured data packets via a mirror port of a network switch or router. The source may also transmit captured data packets included in the traffic flow to the network captured traffic distribution device.

The network captured traffic distribution device may receive the captured data packets from the source, encapsulate the received captured data packets for transmission to an external device via a communication network, and transmit the encapsulated captured data packet to toward the external device via the communication network. The external device may be configured to receive the encapsulated captured data packet from the network captured traffic distribution device and, on some occasions, store the received encapsulated captured data packet. Exemplary external devices include a data storage device, NAS device and a SAN device.

In some embodiments, the system may include a backup storage device communicatively coupled to the network captured traffic distribution device and configured to store the encapsulated captured data packet, information associated with the encapsulated captured data packet, and/or information associated with the traffic flow of captured data packets.

BRIEF DESCRIPTION OF THE DRAWINGS

The present invention is illustrated by way of example, and not limitation, in the figures of the accompanying drawings in which.

DETAILED DESCRIPTION

Figure 1A:
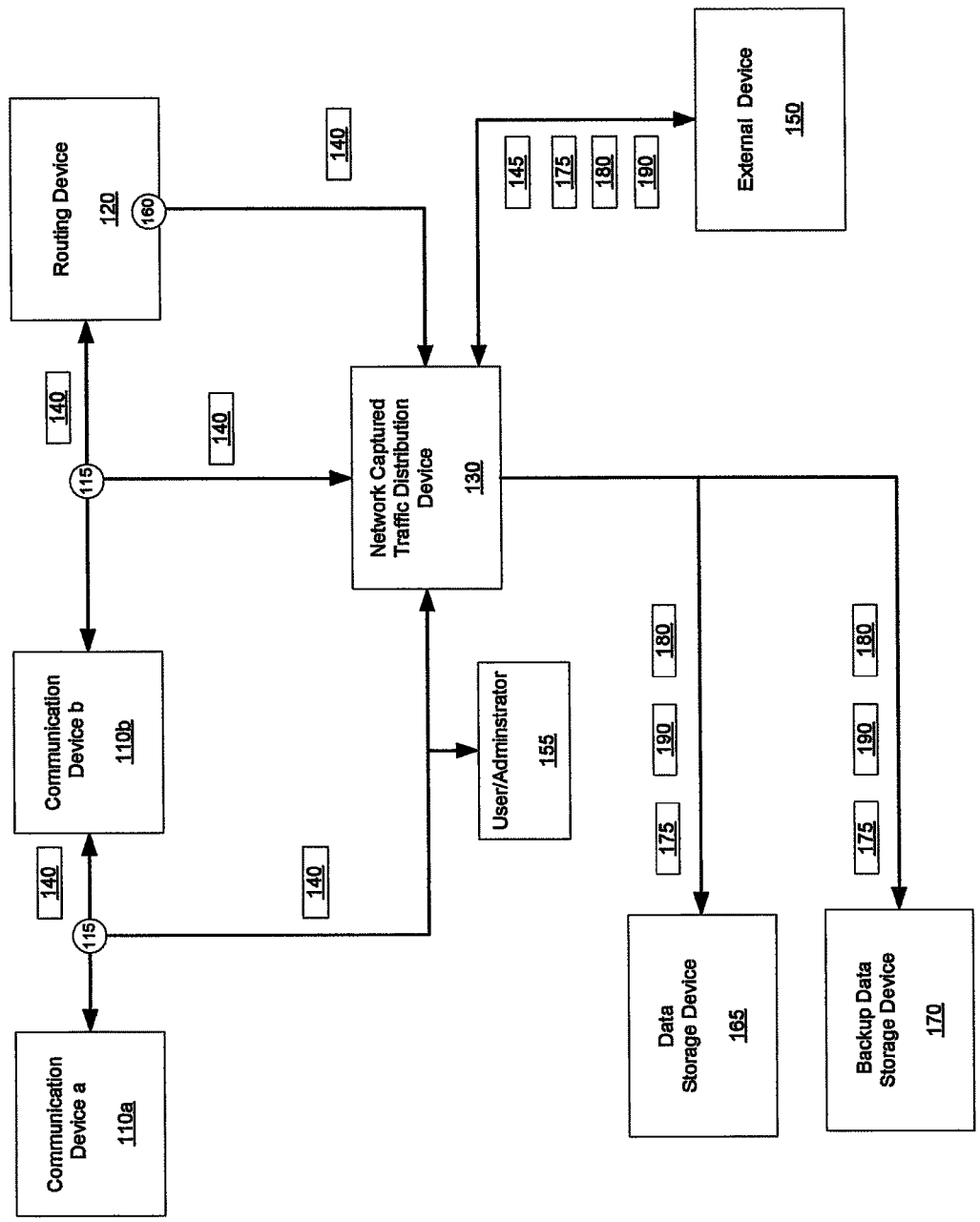
FIGS. 1A, 1B, and 1C are block diagrams depicting exemplary network communication systems, in accordance with embodiments of the present invention.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Throughout the drawings, the same reference numerals and characters, unless otherwise stated, are used to denote like features, elements, components, or portions of the illustrated embodiments. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It is to be appreciated the embodiments of this invention as discussed below may preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

Turning now descriptively to the drawings, it is to be appreciated at times, it may be desirable to transmit captured data packets via a conventional communication network, such as the Internet or a wide area network (WAN). For example, it may be desirable to transmit large quantities of captured data packets to remote data storage devices, servers, and/or network monitoring devices via the Internet over, for example, a TCP connection.

Typically, captured data packets include address information indicating an original destination of a data packet prior to its capture. Transmission of these captured data packets within conventional communication networks may result their transmission toward their original destination, not a destination intended by a network capture traffic distribution device receiving the captured traffic. Therefore, encapsulation of captured data packets with new address information indicating an address intended by the network capture traffic distribution device may be desired so that when captured data packets are transmitted via a conventional communication network they are received at destinations intended by the network capture traffic distribution device, not their original destinations.

It may also be desirable to format captured data packets so that they are compatible with a receiving data storage and/or network monitoring device. Data packets may be reformatted prior to their encapsulation.

It may further be desirable to encrypt an encapsulated and/or reformatted captured data packet transmitted to a receiving data storage and/or network monitoring device. This is especially the case when the captured data packets are transmitted via a public or non-secure communication network, such as the Internet.

FIG. 1A is block diagram depicting a network communication system 100 in which one or more of the processes disclosed herein may be executed. System 100 may be, for example, any packet switched communication network, such as a telecommunication system, a Code Division Multiple Access (CDMA) system, a system compliant with the WEE 802.1 Q standard for configuring virtual LANs (VLAN), or a system enabled to transmit and/or receive data packets including VLAN tags. System 100 may also be a virtual communication network, a cloud-computing network, a local area network (LAN), or a wireless LAN (WLAN).

The components of system 100 may be communicatively coupled to one another via one or more communication links. The communication links may be any conventionally available communication link, such as a wireless link, or a wired link such as an Ethernet cable, a 10/100 Ethernet cable, a 1 gigabit Ethernet cable, a 10 gigabit Ethernet cable, a copper cable, and an optical fiber cable.

System 100 may include two communication devices 110a and 110b communicatively coupled to one another. Exemplary communication devices 110a and 110b include personal computers, mobile computing devices, and mobile telephones. Communication device 110a may generate a data packet 140 and transmit data packet 140 to a routing device, such as routing device 120, via a communication link. Routing device 120 may be any router enabled to route data packets 140 through communication system 100. Communication device 110a may also receive a data packet 140 from communication device 110b via a communication link.

System 100 may also include a network captured traffic distribution device 130, which may be any network captured traffic distribution device capable of receiving captured network traffic. Network captured traffic distribution device 130 may include a plurality of ports by which the network captured traffic distribution device may communicate with another device included in system 100 and may receive and/or transmit captured traffic. In some cases, a port may be a monitor port or a stacking port. Network captured traffic distribution device 130 may also be communicatively coupled so as to provide information to and/or receive instructions from a user and/or administrator 155. User/administrator 155 may be, for example, a user and/or administrator of, for example, system 100 and/or network captured traffic distribution device 130.

Network captured traffic distribution device 130 may be communicatively coupled to a mirror port 160 present on routing device 120 via a port and may receive a traffic flow of captured data packets, including data packet 140, from routing device 120 via mirror port 160. Network captured traffic distribution device 130 may also be communicatively coupled to a traffic capture point 115 located along a communication link between communication device 110a and routing device 120 and/or between communication devices 110a and 110b and thereby may capture data packets, like data packet 140, via an inline network traffic capture at traffic capture point 115.

Network captured traffic distribution device 130 may communicate a captured data packet 145 to an external device 150 via, for example, a port. External device 150 may include multiple input/output ports that may operate in duplex or half-duplex mode. Exemplary external devices 150 include network monitors and network analyzing devices.

Network captured traffic distribution device 130 may further be configured to encapsulate a captured data packet 140 thereby generating an encapsulated captured data packet 175. Data packet 140 may be encapsulated using any available encapsulation protocol such as, but not limited to, packet capture (PCAP), libPcap, and WinPcap. Network captured traffic distribution device 130 may then transmit encapsulated captured data packet 175 toward external device 150, a data storage device 165, and, in some cases, a backup storage device 170.

In some embodiments, network captured traffic distribution device 130 may also be configured to reformat a captured data packet 140 using, for example, any available data storage protocol and thereby generate a reformatted captured data packet 180. The reformatting of captured data packet 140 may be executed such that it is compatible with a format used by a receiving external device, such as external device 150 and/or a data storage device, such as data storage device 165 and/or backup data storage device 170. In other embodiments, network captured traffic distribution device 130 may also be configured to encrypt a captured data packet 140, for example, using any available encryption protocol and thereby generate an encrypted captured data packet 190.

Data storage device 165 and backup data storage device 170 may be any data storage devices enabled to store encapsulated captured data packet 175, reformatted captured data packet 180, and/or encrypted captured data packet 190 such as, but not limited to, a database, a NAS device, and a SAN device. Although only one data storage device 165 and backup data storage device 170 are depicted in FIG. 1A, it should be understood that data storage device 165 and backup data storage device 170 may represent a plurality of data storage devices resident inside and/or outside network captured traffic distribution device 130.

In some embodiments, data storage device 165 and/or backup data storage device 170 may include a plurality of data storage files or catalogs that may be associated with one or more characteristics. On some occasions, data storage device 165 and/or backup data storage device 170 may be enabled to analyze encapsulated captured data packet 175, reformatted captured data packet 180, and/or encrypted captured data packet 190 in order to determine a characteristic associated therewith and store them in a data file associated with the determined characteristic. On other occasions, encapsulated captured data packet 175, reformatted captured data packet 180, and/or encrypted captured data packet 190 may be encapsulated and/or reformatted such that when they are received by storage device 165 and/or backup data storage device 170, they are automatically stored in a data file associated with a respectively determined characteristic.

Figure 1B:
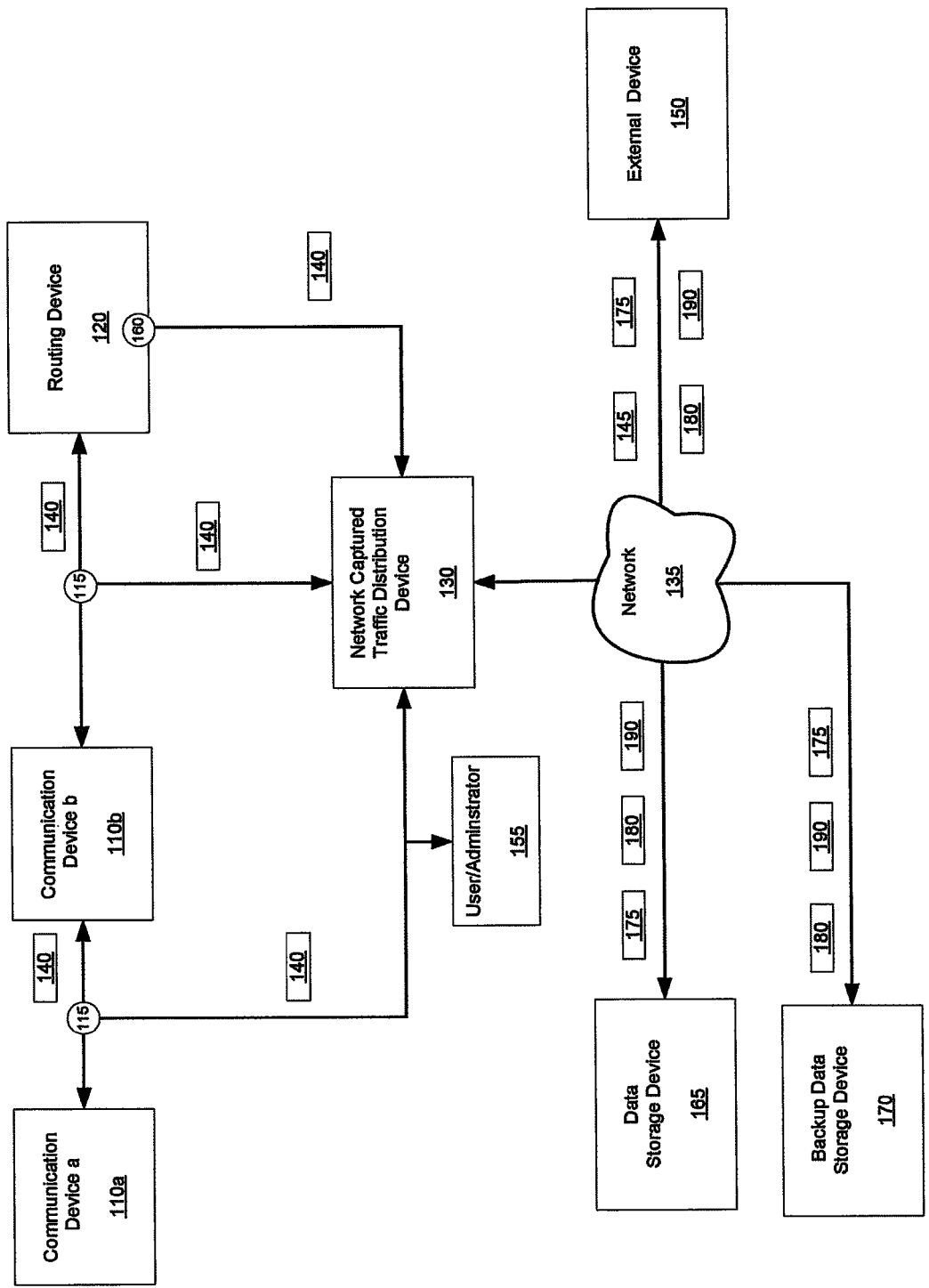

FIG. 1B is block diagram depicting a network communication system 101 in which one or more of the processes disclosed herein may be executed. System 101 includes all of the components of system 100 and a network 135. Network 135 and may be any communications network such as, but not limited to, the Internet, a wide area network (WAN), and a local area network (LAN). In one embodiment, system 101 may be, for example, a virtual computer network and/or a cloud computing network that operates via a communicative coupling of network captured traffic distribution device 130 to external device 150, data storage device 165, and/or backup data storage device 170 via network 135.

In some embodiments, network captured traffic distribution device 130 may be enabled to transmit captured data packet 145, encapsulated captured data packet 175, reformatted captured data packet 180, and/or encrypted data packet 190 to external device 150, data storage device 165, and/or backup data storage device 170 via a network file transfer protocol, a transmission control protocol (TCP), a file transfer protocol (FTP), a network file system (NFS) protocol, and a Internet small computer system interface (iSCSI) through network 135.

Figure 1C:
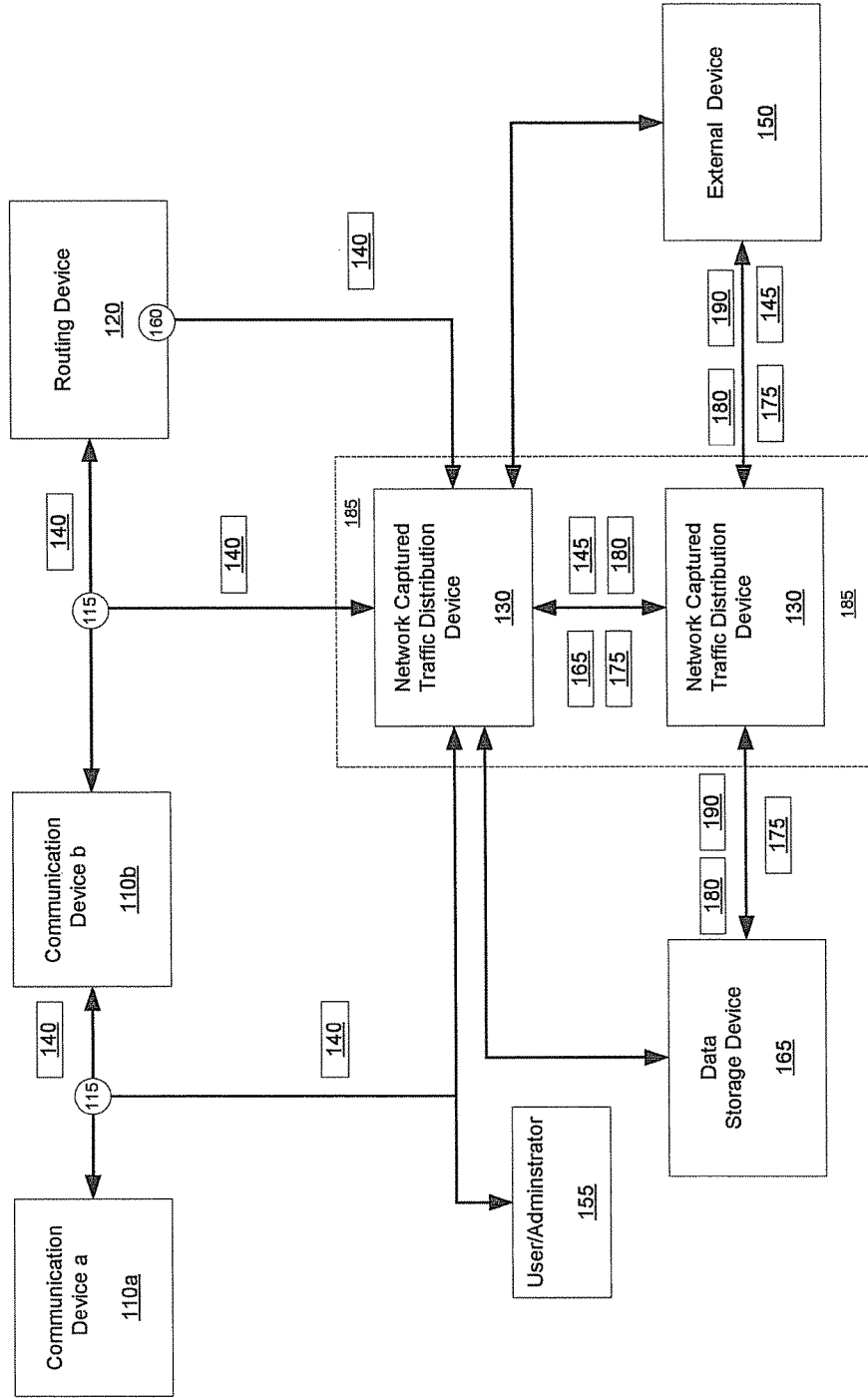

FIG. 1C is block diagram depicting a network communication system 102 in which one or more of the processes disclosed herein may be executed. System 102 includes all of the components of system 100 and two network captured traffic distribution devices 130 communicatively coupled, or stacked together, in a stacked topology 185. More details regarding communicatively coupling or stacking network captured traffic distribution devices together is provided in U.S. patent application Ser. No. 12/898,501, which is hereby incorporated by reference in its entirety. Although only two network captured traffic distribution devices 130 are shown in stacked topology 185, any number of network captured traffic distribution devices 130 may be included in stacked topology 185.

In some embodiments, data and configuration information may be exchanged between network captured traffic distribution devices 130 included in stacked topology 185 and, in some instances, analyzing, encapsulating, reformatting, and/or encrypting data packets 140, 145, 175, 180, and/or 190 may be distributed between two or more of the network captured traffic distribution devices 130 included with in stacked topology 185.

Figure 2:
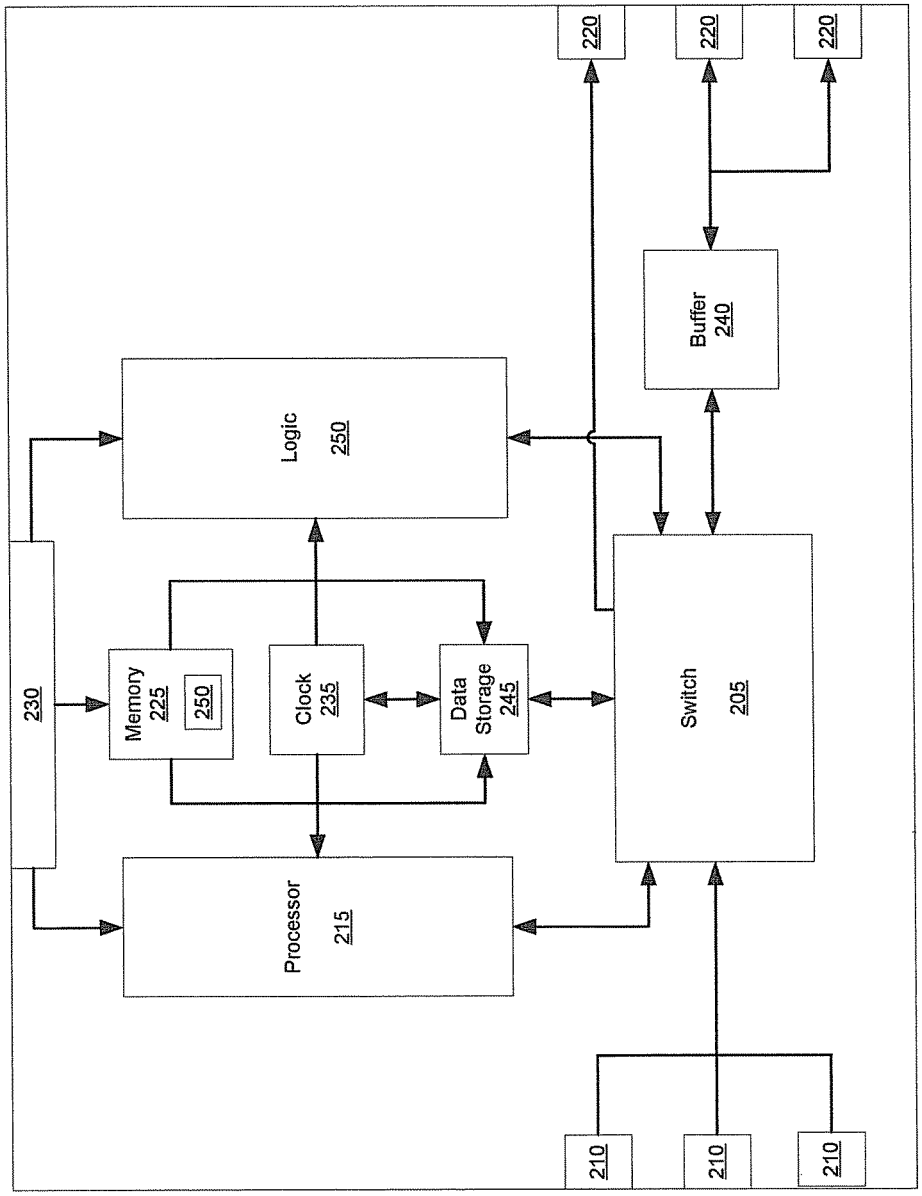
FIG. 2 is a block diagram depicting an exemplary network captured traffic distribution device, in accordance with embodiments of the present invention.

FIG. 2 is a block diagram depicting an exemplary network captured traffic distribution device 130. Network captured traffic distribution device 130 includes a plurality of ingress ports 210 and a plurality of egress ports 220. One or more egress ports 220 may be configured as a monitoring and/or stacking port. Data packets, such as data packet 140, may be received by network captured traffic distribution device 130 via one or more ingress ports 210. Data packets may be received from a source of captured traffic, such as a mirror port, like mirror port 160, and/or an inline traffic capture point, like inline traffic capture point 115. On some occasions, an ingress port 210 and/or an egress port 220 may operate bi-directionally.

Switch 205 may be communicatively coupled to ingress ports 210, egress ports 220, a logic component 250, a data storage component 245, and a processor 215. Switch 205 may include, for example, one or more switches and may be, for example, an analog, digital, and/or transistor switch. Switch 205 may be configured to, for example, transfer captured data packets received from ingress ports 210 to logic component 250 and/or processor 215 and transfer data and encapsulated, formatted, and/or encrypted captured data packets from logic component 250 and/or processor 215 to egress ports 220 and/or data storage 245. Switch 205 may be further configured to transfer analysis and statistical information regarding captured data packets and/or the traffic flow of captured data packets to egress ports 220 and/or data storage 245.

In some embodiments, switch 205 may be communicatively coupled to a buffer 240. Buffer 240 may be any data storage or buffering device enabled to temporarily store, or buffer, data and/or encapsulated, refolinatted, and/or encrypted captured data packets transmitted from network captured traffic distribution device 130 via an egress port 220.

A memory 225 may be communicatively coupled to logic component 250, processor 215, and/or management port 230. Memory 225 may be any appropriate data storage device, like static random access memory (SRAM), dynamic random access memory (DRAM), read-only memory (ROM), flash memory, a magnetic computer storage device (e.g., hard disk, floppy disk, and magnetic tape), and optical media and may store one or more sets of instructions 250 executable by processor 215 and/or logic component 250.

Memory 225 may be further communicatively coupled to a clock 235. Clock 235 may be configured to count or increment a sequence of numbers by which a sequential order in which captured data packets are received by the network captured traffic distribution device may be determined. In other embodiments, clock 235 may be configured to keep conventional time in, for example, a year, month, day, and/or time of day basis. The clock values generated by clock 235 may then be communicated to processor 215 and/or logic component 250 in order to, for example, determine a time that a captured data packet and/or a segment of a traffic flow of captured data packets is received by network captured traffic distribution device 130. This determined time may then be used by, for example, processor 215 and/or logic component 250 to associate a time stamp indicating the determined time with the captured data packet and/or segment of a traffic flow of captured data packets.

Processor 215 may be any appropriate processing device, such as a central processing unit (CPU) and/or a field programmable gate array (FPGA) and may execute one or more instructions resident in, for example, memory 225. Processor 215 may be communicatively coupled to, for example, logic component 250, switch 205, memory 225, and/or management port 230. Processor 215 may be managed by, for example, a user and/or administrator, like user/administrator 155 via, for example, a management port, like management port 230.

Logic component 250 may be any appropriate logic device or devices enabled to execute some, or all, of the processes described herein. Logic component 250 may be communicatively coupled to, for example, switch 205, processor 215, and/or management port 230. In one embodiment, logic component 250 may reside in, for example, a field programmable gate array (FPGA). In another embodiment, logic may be an application specific hardware device enabled to execute some, or all, of the processes described herein, such as an application specific integrated circuit (ASIC). Logic component 250 may be managed by, for example, a user and/or administrator, like user/administrator 155 via, for example, a management port, like management port 230.

Processor 215 and/or logic component 250 may be enabled execute one or more sets of instructions 250 stored in, for example, memory 225. For example, processor 215 and/or logic component 250 may be enabled to analyze, encapsulate, translate, reformat, and/or encrypt captured data packets. Processor 215 and/or logic component 250 may also be enabled to analyze a received traffic flow of captured data packets and gather statistics regarding this analysis.

In some embodiments, network captured traffic distribution device 130 may include a PHY (not shown) communicatively coupled to one or more of ingress port(s) 210 and/or egress ports 220. The PHY may be any device capable of connecting an ingress port 210 and/or an egress port 220 to a communication link in order to facilitate communication between an external device coupled to the communication link and network captured traffic distribution device 130.

Figure 3:
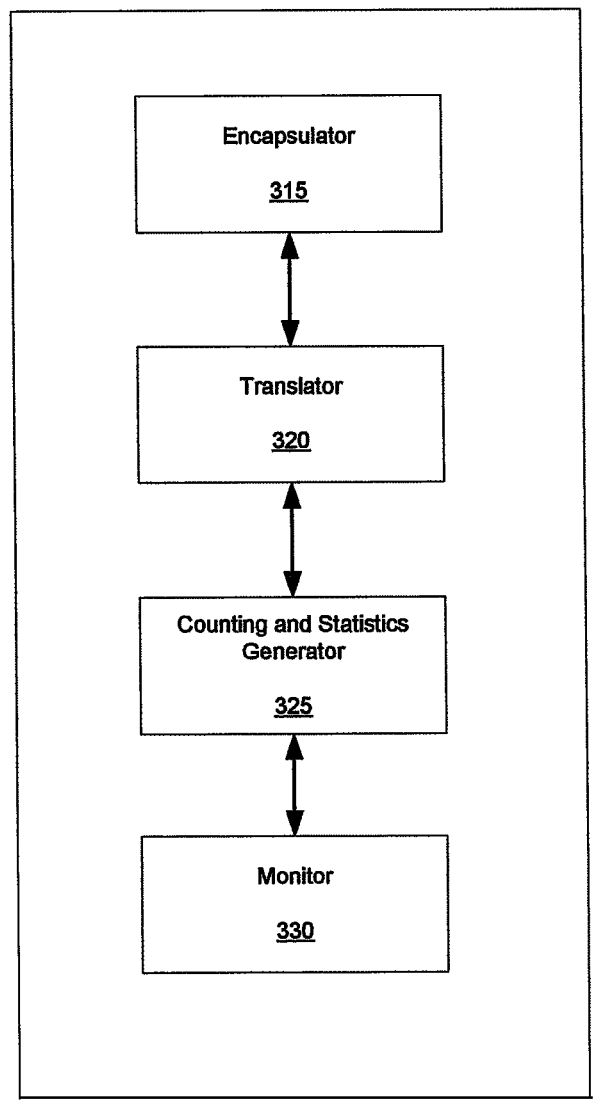
FIG. 3 is a block diagram depicting an exemplary set of instructions, in accordance with embodiments of the present invention.

FIG. 3 is a block diagram illustrating exemplary set of instructions 250 including multiple sub-sets of instructions or modules. For example, set of instructions 250 may include an encapsulator module 315, a translator module 320, an accounting and statistics generator module 325, and/or a monitor module 330 communicatively coupled to one another.

Encapsulator module 315 may include a set of instructions, which when executed by logic component 250 and/or processor 215 may encapsulate captured data packets according to one or more encapsulation, data transmission, and/or data storage protocols. Exemplary data storage protocols include packet capture (PCAP), libPcap, and WinPcap.

Translator module 320 may include a set of instructions, which when executed by logic component 250 and/or processor 215 may translate information associated with a captured data packet from its original format into a format compatible with, for example, a data storage device, such as data storage device 165, backup data storage device 170, and/or data storage 245 and/or an external device, such as external device 150.

Counting and statistic generator module 325, may include a set of instructions, which when executed by logic component 250 and/or processor 215 may analyze received captured data packets and/or a traffic flow of captured data packets according to a criterion and compile counting and statistical information based on the determined analysis. In some embodiments, the compiled accounting and statistical information may be stored in, for example, data storage 245 and made later be accessed, polled, and/or downloaded by, for example, an external device, such as external device 150 and/or a data storage device, such as data storage device 165 and/or backup data storage device 170.

Monitor module 315, may include a set of instructions, which when executed by logic component 250 and/or processor 215 may analyze and/or monitor one or more characteristics of, for example, a captured data packet included in the traffic flow of captured data packets and/or the traffic flow of captured data packets.

Figure 4:
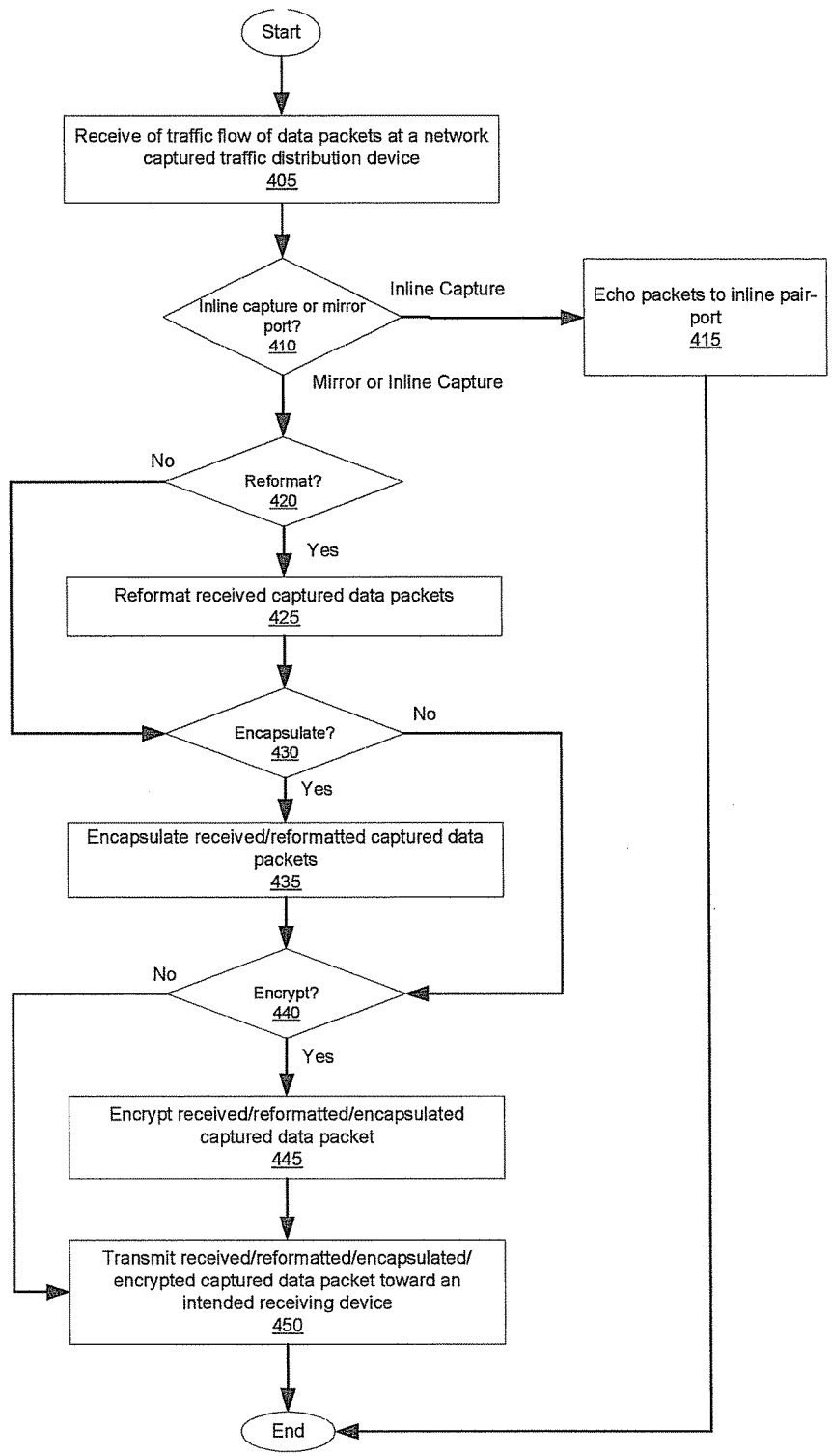
FIG. 4 is a flow chart depicting an exemplary process for reformatting, encapsulating, and/or encrypting captured data packets, in accordance with embodiments of the present invention.

FIG. 4 is a flowchart illustrating an exemplary process 400 for reformatting, encapsulating, and/or encrypting a captured data packet. Process 400 may be executed by, for example, any of the systems and/or system components disclosed herein.

In step 405, a traffic flow of captured data packets may be received at a network captured traffic distribution device are via, for example, a mirror port resident on a source of the captured data packets, such as, mirror port 160 and a traffic capture point located along a communication link between two communicating devices, such as, traffic capture point 115. The traffic flow of captured data packets may be received at a rate of, for example, 1 gigabit per second, 10 gigabits per second, 40 gigabits per second, 40 gigabits per second via dense wavelength-division multiplexing, and/or 100 gigabits per second.

In step 410, it may be determined whether a captured data packet is received via an inline capture point or a mirror port. When a captured data packet is received via an inline capture point, the captured data packet may be echoed to an inline pair-port resident on, for example, the receiving network captured traffic distribution device (step 415). In some embodiments, an inline pair-port may be an egress port resident in, for example, the network captured traffic distribution device, such as egress port 220.

Figure 5:
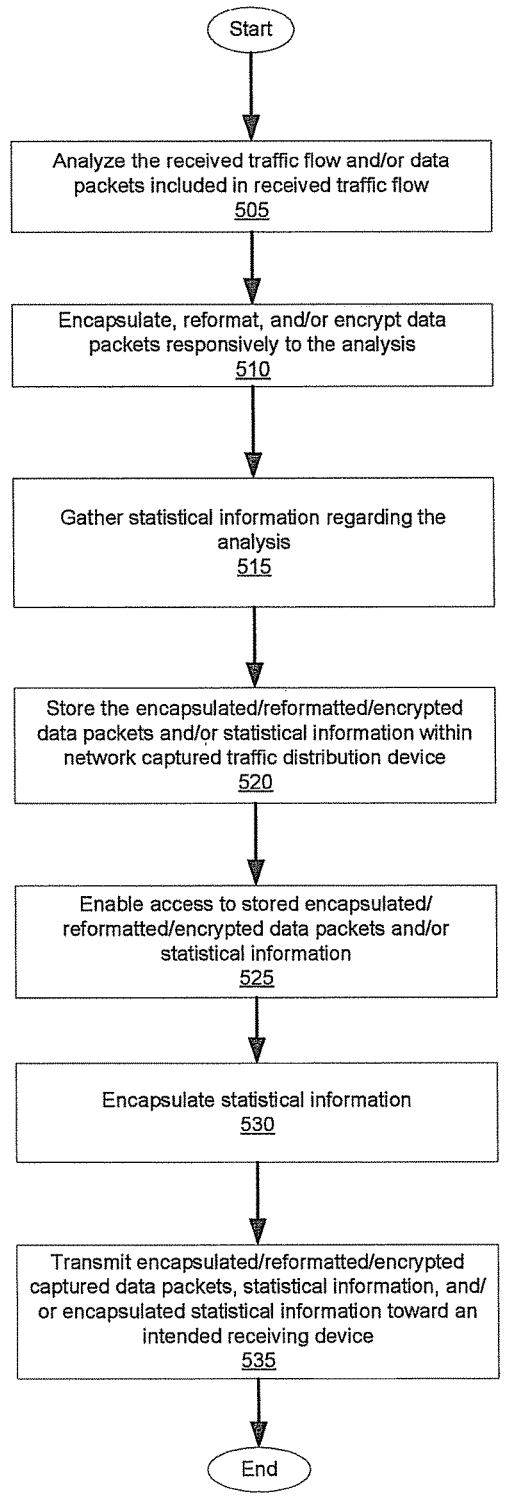
FIG. 5 is a flow chart depicting an exemplary process for analyzing the receive traffic flow of captured data packets and/or a captured data packet included within the traffic flow, in accordance with embodiments of the present invention.

Whether received via a mirror port or inline capture point, in step 420 a determination regarding whether to reformat a captured data packet may be made. The determination of step 420 may be based upon, for example, one or more instructions included within a set of instructions, such as set of instructions 250 executed by, for example, a processor such as processor 215 and/or logic, such as logic component 250. In some embodiments, the determination of step 420 may be based upon, for example, one or more characteristics associated with the captured data packet and/or an intended destination for the captured data packet. In some embodiments, the determination of step 420 may be based, at least in part, upon an analysis of the captured data packet as discussed below with regard to process 500 as depicted in FIG. 5.

When the captured data packet is to be reformatted, the captured data packet may be reformatted (step 425) to be compatible with, for example, one or more data packet formats such as, but not limited to, a data storage format, a format readable by a data storage device, such as data storage device 165 and backup data storage device 170, a format readable by an external device, such as external device 150, a format readable by a network monitoring tool, and a format readable by a network analysis device. For example, when a characteristic of a captured data packet indicates that an intended destination for the captured data packet is a particular data storage device, such as data storage device 165 and/or backup data storage device 170, the captured data packet may be reformatted into a format compatible with the particular data storage device.

Whether reformatted or not, in step 430, a determination regarding whether to encapsulate a captured data packet may be made. The determination of step 430 may be based upon, for example, one or more instructions included within a set of instructions, such as set of instructions 250 executed by, for example, a processor such as processor 215 and/or a logic such as logic component 250. In some embodiments, the determination of step 430 may be based upon one or more characteristics associated with the captured data packet and/or an intended destination for the captured data packet. In other embodiments, the determination of step 430 may be based, at least in part, upon an analysis of the captured data packet as discussed below with regard to process 500 as depicted in FIG. 5.

In step 435, the received and/or reformatted captured data packet may be encapsulated. The data packets may be encapsulated using, for example, a data storage protocol, the packet capture (PCAP) protocol, the libPcap protocol and/or the winPcap protocol.

In some embodiments, the received and/or reformatted captured data packets may be encapsulated such that they may be transmitted via a communication network, such as communication network 135 toward an intended receiving device, such as external device 150, and/or a data storage device, such as data storage device 165, the and/or backup data storage device 170. In these embodiments, the encapsulation may serve to encapsulate, or otherwise render ineffective, original address information associated with the captured data packet such that when the captured data packet is transmitted externally from the network captured traffic distribution device, it is not directed to its original destination and instead is directed toward the receiving device intended by the network captured traffic distribution device. In this way, the captured data packets may be encapsulated to include new destination address information such that they are directed toward the receiving device intended by the network captured traffic distribution device instead of their originally intended destination. For example, when an intended destination for the captured data packet is an external device, such as external device 150 and/or an external data storage device, such as data storage device 165, and/or backup data storage device 170 the captured data packet may be encapsulated so that the original address information for the captured data packet is rendered ineffective and the encapsulated captured data packet includes address information for the intended external device.

Optionally, in step 440, a determination regarding whether to encrypt the received, reformatted, and/or encapsulated captured data packet may be made. The determination of step 440 may be based upon, for example, one or more instructions included within a set of instructions, such as set of instructions 250 executed by, for example, a processor, such as processor 215 and/or a logic, such as logic component 250. In some embodiments, the determination of step 440 may be based upon one or more characteristics associated with the captured data packet and/or an intended destination for the captured data packet. In other embodiments, the determination of step 440 may be based, at least in part, upon an analysis of the captured data packet as discussed below with regard to process 500 as depicted in FIG. 5.

The received, reformatted, and/or encapsulated captured data packet may be encrypted using one or more conventional encryption protocols or methods (step 445). The received, reformatted, encapsulated, and/or encrypted captured data packet may then be transmitted toward, for example, an intended receiving device, such as data storage 245, data storage device 165, backup data storage device 170, and/or an external device, such as external device 150 (step 450). The encapsulated, reformatted, and/or encrypted captured data packets may be transmitted toward the intended receiving device via, for example an optical fiber communication link, an Ethernet communication link, a TCP communication link, a network communication link, a packet-switched network communication link, and a wireless communication link.

FIG. 5 is a flow chart depicting an exemplary process 500 for analyzing received captured data packets and transmitting encapsulated, reformatted, and/or encrypted captured data packets and/or statistical information toward an intended receiving device. Process 500 may be executed by, for example, any of the systems and/or system components disclosed herein. Process 500 may be executed, for example, prior to, during, and/or following execution of process 400 as discussed above with regard to FIG. 4.

In step 505, captured data packets included in the traffic flow of captured data packets and/or the traffic flow itself may be analyzed in order to, for example, determine a characteristic of the captured data packets and/or traffic flow. Exemplary characteristics associated with captured data packets include captured data packet size, content, type, source information, destination information, and encryption information. Exemplary characteristics associated with the traffic flow include the rate at which the traffic flow is received, a density of captured data packets included within the traffic flow, source information, destination information, and encryption information.

Optionally, in step 510, the captured data packets may be reformatted, encapsulated, and/or encrypted responsively to the analysis according to, for example, process 400 as discussed above with regard to FIG. 4. In some cases, the determinations of steps 420, 430, and/or 440 may be based on the analysis of step 505. In some embodiments, the way in which a captured data packet is reformatted, encapsulated, and/or encrypted may be based, in whole or in part, upon the analysis. For example, when a captured data packet is determined to be associated with a particular characteristic, it may be reformatted, encapsulated, and/or encrypted to indicate and/or as a result of the determined characteristic. The captured data packet may also be encapsulated with address information such that it is transmitted to a destination intended for captured data packets including the particular characteristic. For example, a captured data packet associated with a particular characteristic may be encapsulated with address information such that when it is received at its intended destination, it is handled in a manner consistent with other data packets associated with the particular characteristic (e.g., stored in a particular file, indexed in a particular manner, or routed to a particular device).

Optionally, in step 515, statistical information regarding the analyzed captured data packets and/or the traffic flow itself may be gathered based on, for example, the analysis of step 505. Exemplary gathered statistics include a number of captured data packets received during a time period, error information, source and/or destination information for the captured data packets and/or traffic flow, and a percent utilization of the network captured traffic distribution device and/or a component of the network captured traffic distribution device. In some embodiments, the statistical information and, in some cases, the reformatted, encapsulated, and/or encrypted captured data packets may then be stored, internally (e.g., within data storage 245) to the network captured traffic distribution device (step 520). The network captured traffic distribution device may then enable, for example, an external device, such as external device 150, and/or a data storage device, such as data storage device 165 and/or backup data storage device 170 to access, poll, and/or download the stored statistical information and/or reformatted, encapsulated, and/or encrypted captured data packets (step 525).

In some embodiments, for example, when the statistical information and/or reformatted, encapsulated, and/or encrypted captured data packets are not stored internally to the network captured traffic distribution device, the statistical information and/or reformatted and/or encrypted captured data packets may be encapsulated for transmission to an intended receiving device (step 530) according to, for example, step 430 as discussed above with regard to FIG. 4.

Finally, in step 535 the statistical information, encapsulated statistical information, and/or reformatted, encapsulated, and/or encrypted captured data packets may be transmitted toward an intended receiving device, such as data storage 245, data storage device 165, backup data storage device 170, and/or an external device, such as external device 150. In some cases, execution of step 535 may resemble execution of step 450 as discussed above with regard to FIG. 4. Following step 535, process 500 may end.

Figure 6:
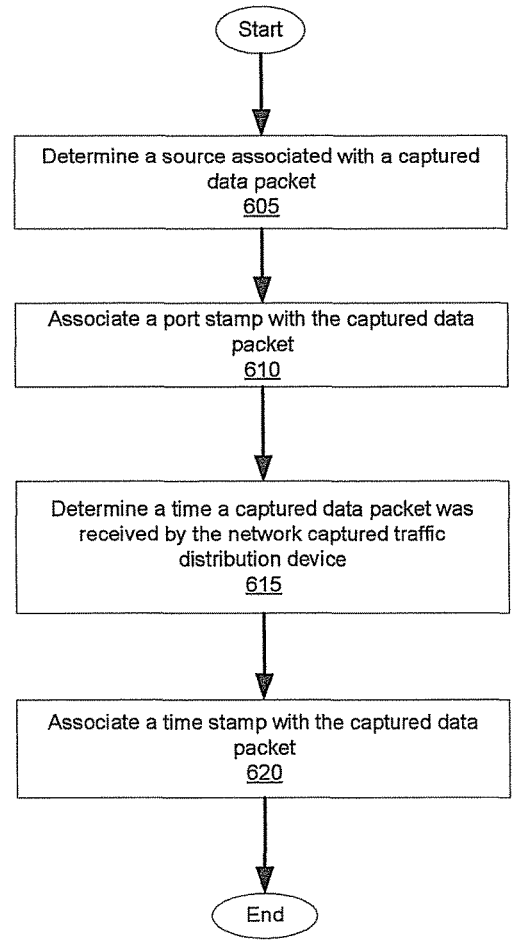
FIG. 6 is a flow chart depicting an exemplary process for associating a port stamp and/or a time stamp with a captured data packet, in accordance with embodiments of the present invention.

FIG. 6 is a flow chart illustrating an exemplary process 600 for associating a port stamp and/or a time stamp with an encapsulated, reformatted, and/or encrypted captured data packet. Process 600 may be executed by, for example, any of the systems and/or system components disclosed herein. Process 600 may be executed, for example, prior to, during, and/or following execution of processes 400 and/or 500 as discussed above with regard to FIGS. 4 and 5.

In step 605, an identity of a source of a received captured data packet may be determined In some cases, the determination of 605 may include determining a source port identity associated with the received captured data packet. Then, in step 610, a port stamp indicating the determined source of the captured data packet may be associated with the captured data packet. In some cases, association of the port stamp with the captured data packet may be part of the encapsulation process as described above with regard to processes 400 and/or 500 depicted in FIGS. 4 and 5.

Alternatively, or in addition to, a time that the captured data packet is received by the network captured traffic distribution device may be determined (step 615). In some cases, the time may be determined with the assistance of a clock, such as clock 235. The time may be determined by, for example, determining the captured data packet's placement within a sequential traffic flow of captured data packets, determining a counter value associated with the captured data packet, or determining a traditional time value (e.g., 4:33:04 pm) the captured data packet was received by the network captured traffic distribution device. Next, in step 620, a time stamp indicating the determined time may be associated with the captured data packet. In some embodiments, association of the time stamp with the captured data packet may be included within the encapsulation process as described above with regard to processes 400 and/or 500 depicted in FIGS. 4 and 5. Following step 620, process 600 may end.

Figure 7:
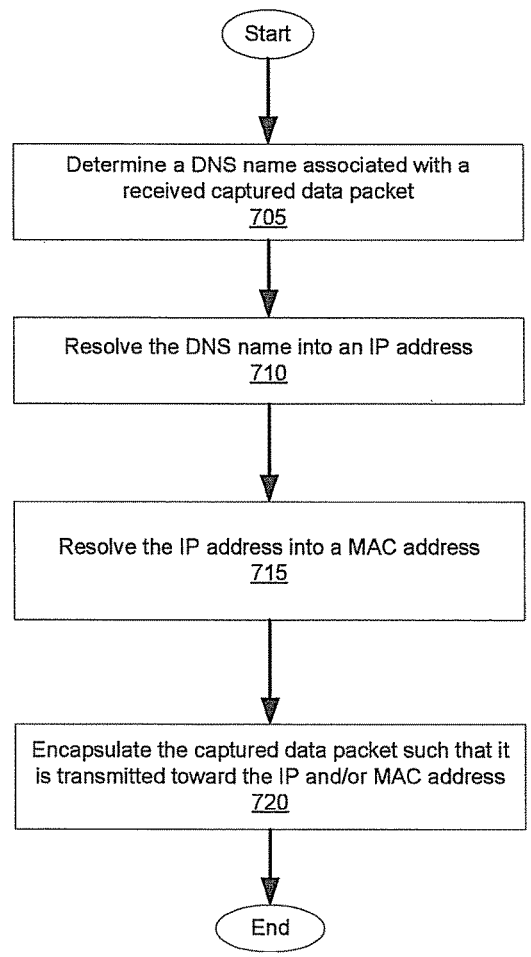
FIG. 7 is a flow chart depicting an exemplary process for encapsulating a captured data packet such that it is transmitted toward an IP address and/or a MAC address associated with a device, in accordance with embodiments of the present invention.

FIG. 7 is a flow chart depicting an exemplary process 700 for transmitting an encapsulated data packet toward an IP and/or MAC address. Process 700 may be executed by, for example, any of the systems and/or system components disclosed herein. Process 700 may be executed, for example, prior to, during, and/or following execution of processes 400, 500, and/or 600 as discussed above with regard to FIGS. 4, 5, and 6.

In step 705, a domain name system (DNS) name associated with a received captured data packet may be determined via any conventionally available method. The DNS name may then be resolved into an Internet protocol (IP) address via any conventionally available method (step 710). Optionally, the IP address may then be resolved into a media access control (MAC) address via any conventionally available method (step 715). Then, in step 720, the received captured data packet may be encapsulated such that it is transmitted, via, for example, steps 450 and/or 535 as discussed above with regard to FIGS. 4 and 5 toward an intended receiving device associated with at least one of the IP address and/or MAC address. Following step 720, process 700 may end.

Thus, what has been described above are illustrative methods, devices, and systems for encapsulating, reformatting, and/or encrypting captured data packets. It is to be understood optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the present invention and of the manner and process of making and using it in such full, clear, concise, and exact terms as to enable any person skilled in the art to which it pertains to make and use these devices and methods. The present invention is, however, susceptible to modifications and alternative method steps from those discussed above that are fully equivalent. Consequently, the present invention is not limited to the particular embodiments disclosed. On the contrary, the present invention encompasses all modifications and alternative constructions and methods coming within the spirit and scope of the present invention.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A device comprising:
   a plurality of ingress ports configured to receive a traffic flow of captured data packets from a source of captured data packets and transmit the traffic flow of captured data packets to a switch;
   a plurality of egress ports configured to receive selectively encapsulated captured data packets from the switch and transmit selectively encapsulated captured data packets from the device toward an external device via a communication network;
   the switch communicatively coupled to the plurality of ingress ports, the plurality of egress ports, and at least one of a logic component and a processor and configured to transfer captured data packets received from the plurality of ingress ports to the at least one logic component and processor and transfer data and selectively encapsulated captured data packets from the at least one logic component and processor to the plurality of egress ports;
   the at least one logic component and processor, communicatively coupled to the switch and configured to receive captured data packets from the switch, execute instructions stored in a memory, wherein execution of the instructions includes selectively encapsulating the received captured data packets for transmission to the external device via the communication network, and transmitting selectively encapsulated captured data packets to the external device, wherein said selective encapsulating comprises analyzing the received captured data packets in order to determine a characteristic associated with the received captured data packets, determining, based on the characteristic, whether to encapsulate the received captured data packets, and incorporating address information that is determined from the determined characteristic into the selectively encapsulated captured data packets responsive to the determination, wherein the characteristic is selected from the group consisting of: size of the received captured data packets, type of the received captured data packets, density of captured data packets included within the traffic flow and encryption information associated with the received captured data packets; and
   a memory, communicatively coupled to the at least one logic component and processor and configured to store instructions executable by the at least one logic component and processor.

2. The network captured traffic distribution device of claim 1, wherein an egress port of the plurality of egress ports is enabled to transmit data from the network captured traffic distribution device via at least one of a network file transfer protocol, a transmission control protocol (TCP), a file transfer protocol (FTP), a network file system (NFS) protocol, and a Internet small computer system interface (iSCSI).

3. The network captured traffic distribution device of claim 1, wherein the external device is at least one of an external data storage device, a database, a network attached storage (NAS) device, and a storage area network (SAN) device.

4. The network captured traffic distribution device of claim 1, wherein at least one of the logic component and the memory are user configurable.

5. The network captured traffic distribution device of claim 1, wherein the memory is further configured to store at least one of the results of the analysis and the selectively encapsulated captured data packets.

6. The network captured traffic distribution device of claim 5, wherein the memory is further configured to enable access to the stored at least one of results of the analysis and selectively encapsulated captured data packets by the external device.

7. The network captured traffic distribution device of claim 1, further comprising: a buffer communicatively coupled to at least one of the switch and an egress port included in the plurality of egress ports, wherein the buffer is configured to buffer the selectively encapsulated captured data packets transmitted from the egress port.

8. The network captured traffic distribution device of claim 1, wherein executing the instructions further comprises at least one of
- translating information associated with a captured data packet from its original format into a format compatible with a data storage device;
- compiling counting and statistical information based on the determined analysis; and
- monitoring one or more characteristics of at least one of a captured data packet included in the traffic flow of captured data packets and the traffic flow of captured data packets.

9. The network captured traffic distribution device of claim 8, wherein the memory is further configured to store results of at least one of the translation, analysis, and monitoring and enable access to the stored results by the external device.

10. The network captured traffic distribution device of claim 1, wherein the switch is further configured to transfer at least one of selectively encapsulated captured data packets and information regarding selectively encapsulated captured data packets to the memory and the memory is further configured to store the at least one of selectively encapsulated captured data packets and information regarding selectively encapsulated captured data packets.

11. The network captured traffic distribution device of claim 1, further comprising: a data storage device communicatively coupled to at least one of the switch and the at least one logic component and processor, wherein the data storage device is configured to store the selectively encapsulated captured data packets.

12. The network captured traffic distribution device of claim 1, wherein at least one of the egress ports is a stacking port that enables the network captured traffic distribution device to be communicatively coupled to another network captured traffic distribution device and execution of the instructions is distributed between the network captured traffic distribution device and the other network captured traffic distribution device.

13. A method comprising:
- receiving, at a network captured traffic distribution device, a traffic flow of captured data packets, wherein the captured data packets are received via at least one of a mirror port resident on a source of the captured data packets and a traffic capture point located along a communication link between two communicating devices;
- selectively encapsulating, by the network captured traffic distribution device, the received captured data packets for transmission to an external device via a communication network, wherein said selective encapsulating comprises analyzing the received captured data packets to determine a characteristic associated with the received captured packets, determining, based on the characteristic, whether to encapsulate the received captured data packets, and incorporating address information that is determined from the determined characteristic into the selectively encapsulated captured data packets responsive to the determination, wherein the characteristic is selected from the group consisting of: size of the received captured data packets, type of the received captured data packets, density of captured data packets included within the traffic flow and encryption information associated with the received captured data packets; and
- transmitting, by the network captured traffic distribution device, the selectively encapsulated captured data packets toward the external device via the communication network.

14. The method of claim 13, wherein the encapsulating further comprises:
- storing a result of the analysis internally to the network captured traffic distribution device; and
- enabling, by the network captured traffic distribution device, access to the stored analysis result by the external device.

15. The method of claim 13, further comprising:
- encrypting, by the network captured traffic distribution device, the selectively encapsulated captured data packets prior to transmission of the selectively encapsulated captured data packets toward the external device.

16. The method of claim 13, wherein the received captured data packets are selectively encapsulated using at least one of a data storage protocol, a packet capture (PCAP) protocol, a libPcap protocol, and a WinPcap protocol.

17. The method of claim 13, wherein the external device is at least one of a database, a server, a network attached storage (NAS) device, a storage area network (SAN) device, a network monitoring device, and a network analysis device.

18. The method of claim 13, wherein the selectively encapsulated captured data packets are transmitted toward the external device via at least one of an optical fiber communication link, an Ethernet communication link, a transmission control protocol (TCP) communication link, a network communication link, a packet-switched network communication link, and a wireless communication link.

19. The method of claim 13, further comprising:
- determining, by the network captured traffic distribution device, a domain name system (DNS) name associated with the selectively encapsulated captured data packets;
- resolving, by the network captured traffic distribution device, the DNS name into an Internet protocol (IP) address;
- resolving, by the network captured traffic distribution device, the IP address into a media access control (MAC) address; and
- transmitting, by the network captured traffic distribution device, the selectively encapsulated captured data packets toward an external device associated with at least one of the IP address and the MAC address via a transmission control protocol (TCP) communication link.

20. The method of claim 13, wherein the encapsulation includes at least one of:
- determining, by the network captured traffic distribution device, a source of the captured data packets and associating a port stamp with the captured data packets indicating the determined source; and determining, by the network captured traffic distribution device, a time when the captured data packets is received by the network captured traffic distribution device and associating a time stamp with the captured data packets indicating the determined time.

21. The method of claim 13, further comprising:

analyzing, by the network captured traffic distribution device, at least one of the captured data packets and the traffic flow of captured data packets in order to determine a characteristic thereof;

formatting, by the network captured traffic distribution device, a result of the analysis in a format compatible with the external device; and transmitting, by the network captured traffic distribution device, an encapsulated result of the analysis toward the external device.

22. A method comprising:

receiving, at a network captured traffic distribution device, a traffic flow of captured data packets, wherein the captured data packets are received via at least one of a mirror port resident on a source of the captured data packets and a traffic capture point located along a communication link between two communicating devices;

analyzing, by the network captured traffic distribution device, the captured data packets to determine a characteristic associated with the received captured packets, wherein the characteristic is selected from the group consisting of: size of the received captured data packets, type of the received captured data packets, density of captured data packets included within the traffic flow and encryption information associated with the received captured data packets;

determining, based on the characteristic, whether to encapsulate the received captured data packets;

reformatting, by the network captured traffic distribution device, a captured data packet included in the traffic flow of captured data packets into a format compatible with a data storage device communicatively coupled to the network captured traffic distribution device, wherein the reformatted captured data packet selectively incorporates address information that is determined from the determined characteristic of the received packets responsive to the determination; and transmitting, by the network captured traffic distribution device, the reformatted captured data packet toward the data storage device.

23. The method of claim 22, further comprising:

formatting, by the network captured traffic distribution device, a result of the analysis in a format compatible with the data storage device; and transmitting, by the network captured traffic distribution device, a formatted result of the analysis to the data storage device.

24. The method of claim 23, wherein the data storage device is internal to the network captured traffic distribution device, the method further comprising:

storing, by the network captured traffic distribution device, the results of the analysis in the data storage device; and enabling, by the network captured traffic distribution device, access to the stored analysis results by an external device.

25. The method of claim 22, further comprising:

selectively encapsulating, by the network captured traffic distribution device, the reformatted captured data packets for transmission to the data storage device via a communication network;

transmitting, by the network captured traffic distribution device, the selectively encapsulated captured data packets toward the data storage device via the communication network.

26. The method of claim 22, wherein the received captured data packets are selectively encapsulated using at least one of a data storage protocol, packet capture (PCAP), libPcap, and WinPcap.

27. A system comprising:

a memory;

a processor disposed in communication with said memory, and configured to issue a plurality of instructions stored in the memory;

a source of a traffic flow of captured data packets communicatively coupled to a network captured traffic distribution device coupled to the processor, wherein the source performs at least one of capturing data packets transmitted between two nodes and receiving captured data packets via a mirror port of a network switch and transmits captured data packets included in the traffic flow to the network captured traffic distribution device;

the network captured traffic distribution device, wherein the network captured traffic distribution device is configured to receive the captured data packets from the source, selectively encapsulate the received captured data packets for transmission to an external device via a communication network, and transmit the selectively encapsulated captured data packets toward the external device via the communication network, wherein said selective encapsulation comprises analyzing the received captured data packets to determine a characteristic associated with the received captured packets, determining, based on the characteristic, whether to encapsulate the received captured data packets, and incorporating address information that is determined from the determined characteristic into the selectively encapsulated captured data packets responsive to the determination, wherein the characteristic is selected from the group consisting of: size of the received captured data packets, type of the received captured data packets, density of captured data packets included within the traffic flow and encryption information associated with the received captured data packets; and the external device communicatively coupled to the network captured traffic distribution device via the network and configured to receive the selectively encapsulated captured data packets from the network captured traffic distribution device and store the received selectively encapsulated captured data packets.

28. The system of claim 27, further comprising:

a backup storage device communicatively coupled to the network captured traffic distribution device and configured to store at least one of the selectively encapsulated captured data packets, information associated with the selectively encapsulated captured data packets, and information associated with the traffic flow of captured data packets.

29. The system of claim 27, wherein the external device is at least one of a data storage device, a network attached storage (NAS) device and a storage area network (SAN) device.

* * * * *